United States Patent [19]

Lucas et al.

[11] Patent Number: 4,484,196
[45] Date of Patent: Nov. 20, 1984

[54] ANTENNA DRIVE ARRANGEMENT FOR VERY HIGH FREQUENCY OMIDIRECTIONAL RANGE NAVIGATION SYSTEM

[75] Inventors: James G. Lucas, Wahroonga; Alan C. Young, West Pennant Hills, both of Australia

[73] Assignee: The Commonwealth of Australia

[21] Appl. No.: 280,174

[22] Filed: Jul. 6, 1981

[30] Foreign Application Priority Data

Aug. 1, 1980 [AU] Australia ............................. PE4821

[51] Int. Cl.³ ............................................... G01S 1/44
[52] U.S. Cl. ..................................... 343/404; 343/768
[58] Field of Search ............... 343/768, 853, 854, 398, 343/404

[56] References Cited

U.S. PATENT DOCUMENTS

| | | | |
|---|---|---|---|
| 2,286,839 | 6/1942 | Schelkunoff | 343/853 |
| 2,898,593 | 4/1959 | Ruze | 343/853 |
| 3,427,622 | 10/1928 | Kandoian et al. | 343/404 |
| 3,964,067 | 6/1976 | Lucas | 343/853 |

Primary Examiner—Eli Lieberman
Attorney, Agent, or Firm—Ladas & Parry

[57] ABSTRACT

An antenna drive arrangement for a very high frequency omnidirectional range (VOR) navigation system for aircraft. The antenna has two vertically arrayed antenna elements located above a ground plane, and reference and variable phase signals are distributed to each of the antenna elements in amplitude and phase relationship selected to produce a null in the H-component of the radiated field which is substantially tangential to a projection of the ground plane. The null is located in a region of the field disposed radially outwardly of the antenna array.

10 Claims, 13 Drawing Figures

ANTENNA DRIVE ARRANGEMENT FOR VERY HIGH FREQUENCY OMIDIRECTIONAL RANGE NAVIGATION SYSTEM

FIELD OF THE INVENTION

This invention relates to an antenna drive arrangement for a very high frequency omnidirectional range (VOR) navigation system.

BACKGROUND OF THE INVENTION

The VOR system as such is employed extensively throughout the world and it is operated to provide an aircraft with flight path bearing information. Two signals are radiated by a VOR antenna to produce a rotating field in space, one signal being referred to as a reference phase signal which is radiated omnidirectionally and the other signal being referred to as a variable phase signal which has a phase which varies linearly with azimuth angle. Bearing information is derived by detecting the phase difference between the reference and variable phase signals as received by an aircraft flying toward or from the VOR site.

The reference phase signal is generated as a radio frequency (r.f.) carrier which has a frequency falling within the region 108–118 MHz and which is amplitude modulated by a 30 Hz frequency modulated 9960 Hz subcarrier. The variable phase signal comprises a portion of the r.f. carrier from which the modulation is eliminated and, when radiated, is space amplitude modulated at 30 Hz. The space modulation is achieved by feeding the radiating antenna so as to produce a field which rotates at 1800 RPM or, expressed otherwise, at 30 Hz.

The field which is obtained by combining the reference and variable phase signals is a rotating field containing reference phase and variable phase information.

Bearing information is derived and indicated by a receiver within an aircraft. After processing in the r.f. stage of the receiver and subsequent detection, the received reference and variable phase signals are processed in separate channels and are applied as separate inputs to a phase comparator. Bearing information relative to the VOR site is indicated by the phase difference between the reference and variable phase signals.

The above described system, termed Conventional VOR (CVOR), is susceptible to multipath errors due to reflections from surface irregularities above or below the ground plane of the VOR site. Such surface reflections may be due to the existence of varying topography or to the interfering presence of buildings, fences, trees, etc., and multipath errors flow from vector addition of direct and reflected field components of the field into which the aircraft flies.

Certain multipath errors are minimised by use of a Doppler VOR (DVOR) system in which a 30 Hz amplitude modulated carrier signal (reference phase signal) is radiated omni-directionally and an azimuth dependent signal (variable phase signal) is generated in space (using the Doppler principle) by radiating 9960 Hz frequency modulated side band(s) of the carrier from an array of sequentially switched antennas which are located concentrically about the reference phase signal antenna. A typical DVOR array has 50 antennas disposed around a horizontal aperture of about 5 wavelengths (13.5 meters) diameter.

The DVOR system very successfully reduces multipath in many cases, but it suffers from the following disadvantages:

(a) It does not protect against lobing of the vertical field pattern, (b) It provides no real improvement over the CVOR system for reflections from objects within ±10° of line of sight, and (c) It involves a high capital and installation cost.

The present invention is applicable to a CVOR system and it is directed to the minimization of multipath errors which result from reflections due to radiation into negative angles.

Many en-route VOR sites are placed on small hilltops in order to ensure adequate range in the presence of surrounding hills. However, a small ground plane only is then available and the VOR signal radiates strongly into the region below the horizon. Measurements on difficult (elevated, short ground plane) sites in Australia have shown that the negative angle field can be at least as strong as the field at positive angles, and it is this negative angle radiation that causes most of the multipath errors on such sites. Early work on VOR systems recognised this problem very clearly, but in more recent times the existence of negative angle radiation has largely been ignored or, at least, disregarded by designers (and users) of VOR systems.

Typical problem sites have a ground plane radius (in at least one direction) in the order of $4\lambda$ to $8\lambda$ (10.5 to 21 m.) and significant multipath errors can occur with sites having a ground plane radius up to $20\lambda$. However where a large counterpoise (of radius greater than, say, $20\lambda$) is available multipath errors resulting from any negative angle field radiation are normally acceptable, so the present invention (as hereinafter defined) may be considered as having greatest application to elevated sites which have a ground plane radius less than about 50 m.

Attempts are known to have been made to obviate multipath errors which result from the abovementioned problem sites, by use of vertically stacked antennas. Thus, two-stack and five-stack antenna systems have been developed in an attempt to produce a field pattern which provides a null near zero degrees of elevation. The idea behind such systems presumably is to create a free space field pattern which (theoretically) cuts-off at zero degrees in the far field and which will reduce illumination of the surrounding (negative angle) terrain. However it is thought that the (far field) free-space design approach cannot be entirely satisfactory because it ignores any field contribution from partially formed images that will occur in the short ground plane that is always available. The partially formed images exist as a result of ground currents being induced in the ground plane.

SUMMARY OF THE INVENTION

In contrast with the abovementioned (prior art) multi-stack antenna array systems, the present invention provides a system which allows for the presence of the partially formed images and radiates a signal for the purpose of controlling (i.e. reducing) induced ground currents which give rise to undesirable reflections.

Thus, the present invention provides a VOR system comprising means for generating a reference phase signal, means for generating a variable phase signal, and an antenna array comprising at least two vertically stacked antenna elements located above a ground plane. Additionally, means are provided for feeding both the reference and variable phase signals to the respective antenna elements in amplitude and phase relationship selected to produce at least one null in the H-component of the radiated field which is substantially tangential to a projection of the ground plane. The or each null is located in a region of the field disposed radially outwardly of the antenna array.

The present invention further provides a method of driving a VOR system having an antenna array comprising at least two vertically stacked antenna elements located above a ground plane. Reference and variable phase signals are distributed to each of the antenna elements in amplitude and phase relationship selected to produce at least one null in the H-component of the radiated field which is substantially tangential to a projection of the ground plane. The or each null is located in a region of the field disposed radially outwardly of the antenna array.

The or each null in the H-component of the radiated field may be regarded as equivalent to a "ground current null" if it is assumed that undesirable reflections emanate from ground currents which are induced in an imaginary extension of the ground plane. The assumption that ground currents (albeit, notional ground currents) do exist beyond the counterpoise and in an imaginary extension of the ground plane has been adopted as a design technique by the inventors and, therefore, the invention is hereinafter described in the context of creating "ground current nulls" for the purpose of controlling unwanted reflections from terrain located physically below the level of the ground plane. Thus, for the purpose of the following description, the "ground" in which the ground currents are deemed to exist and in which ground current nulls are located must be understood to be imaginary ground disposed substantially in the plane of and extending about the ground plane.

It should also be understood that the term "null" is employed herein in a relative sense. It is sufficient for the purpose of the invention that the magnitude of the H-component of the field (i.e., the magnitude of the ground currents) at the point(s) of interest be significantly reduced relative to what the magnitude would otherwise be. Therefore, whilst a reduction to zero magnitude is most desirable it is not essential, and the term "null" should be construed as applicable to magnitudes which tend toward but do not necessarily reach zero.

The number of stacked antenna elements will be determined by the number of ground current nulls required within a given radial distance from the antenna array, and the required number of nulls will be determined by the degree of multipath error improvement required over the results which would otherwise be obtainable from a single-stack array. It is envisaged that a two-stack array would be appropriate to meet most site requirements, such an array providing for a single ground current null.

In situations where a two-stack array is deemed to be sufficient and the VOR site has a typical ground plane radius in the region of 8λ, the amplitude and phase relationship of the signals fed to the upper and lower elements are preferably selected to produce the single ground current null in a region falling 12λ to 20λ radially distant from the antenna array. Also, in the case of a two-stack array, the amplitude of the signals fed to the array elements is reduced with increasing height of the elements. When the upper element is located up to about 3λ above the ground plane, the amplitude of the signals fed to the array elements is reduced approximately linearly with height. Thus, assuming that the lower antenna element has a height h and the upper element is located at height 2h, then the amplitude of the signal fed to the upper element will be approximately one-half of the amplitude of the signal fed to the lower element.

The necessity for reducing the signal amplitude with increasing height of the upper antenna element will be hereinafter explained. It is sufficient at this point to state that if, for example, equal amplitude signals were to be delivered to both of the array elements, then, even if the most favourable anti-phase relationship was to exist between the two signals, cancellation of the negative angle fields due to the respective antenna elements would not occur and ground currents would therefore continue to exist in the near field, giving rise to reflections and hence multipath errors. This is in fact what happens in systems which employ the prior art two-stack array to which the previously mentioned free-space design approach is applied.

In the case of a two-stack array, the upper and lower elements are preferably spaced-apart by a distance falling within the range 1λ to 3λ and the lower element is preferably located mid-way between the upper element and the ground plane. Also, assuming that the upper element is located at a height equal to twice the height of the lower element and that the lower element is fed with a (normalised) signal having amplitude 1.0 and phase 0°, the upper element is preferably fed with a signal having a (relative) amplitude falling within the range 0.25 to 0.60 and phase falling within the range 210° to 280°.

The system in accordance with the present invention is compatible with existing VOR systems, and the signal generating means and the antenna elements may be of the type employed in the existing systems. The essential difference between the present invention and prior art systems lies in the use of a multi-stack antenna array which has its elements driven with signals so related as to produce at least one ground current (i.e. tangential H-field component) null in a projection of the ground plane.

The invention will be more fully understood from the following recitation of principles from which the invention has been developed and description of a preferred embodiment of the invention. The description is given with reference to the accompanying drawings:

DETAILED DESCRIPTION OF THE INVENTION

Figure 8:
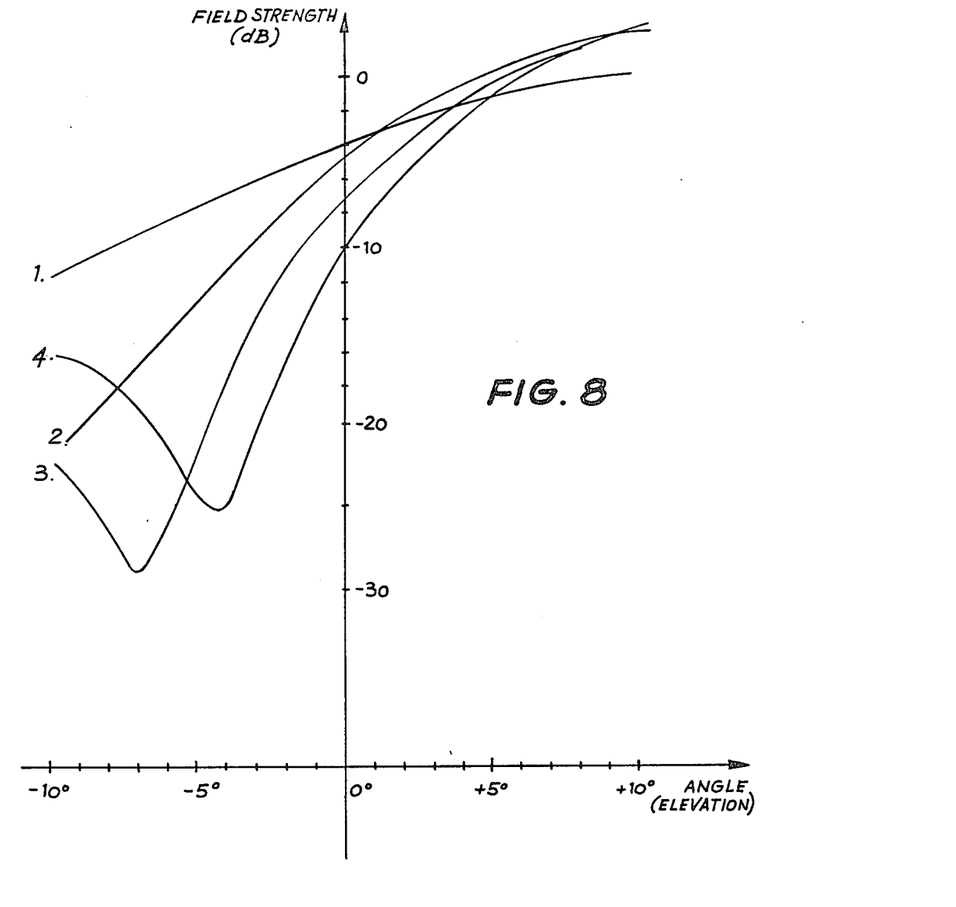
FIG. 8 shows plots of field strength against elevation angle for different drives to the antenna elements of a two-stack array as shown in FIG. 8A.
Figure 9:
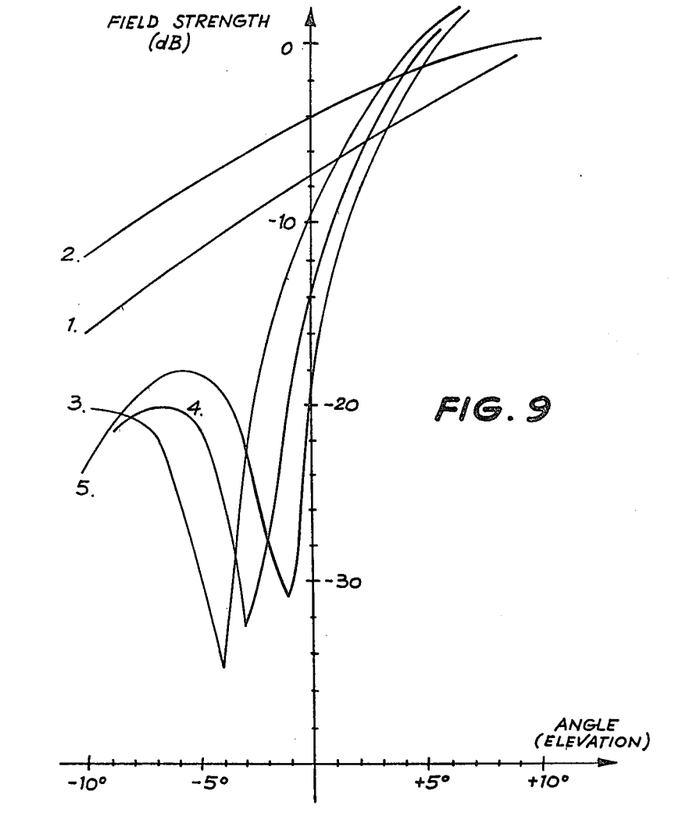
FIG. 9 shows plots of field strength against elevation angle for different drives to the antenna elements of a three-stack array as shown in FIG. 9A.
Figure 10:
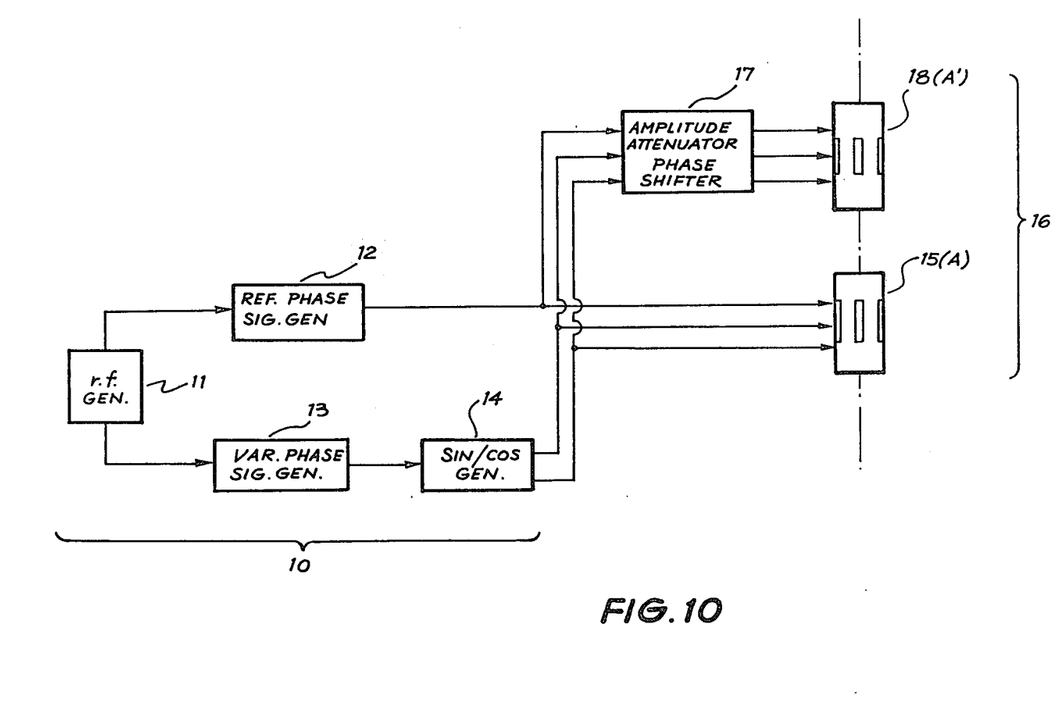
FIG. 10 shows a schematic representation of a VOR system which embodies the present invention.
Figure 11:
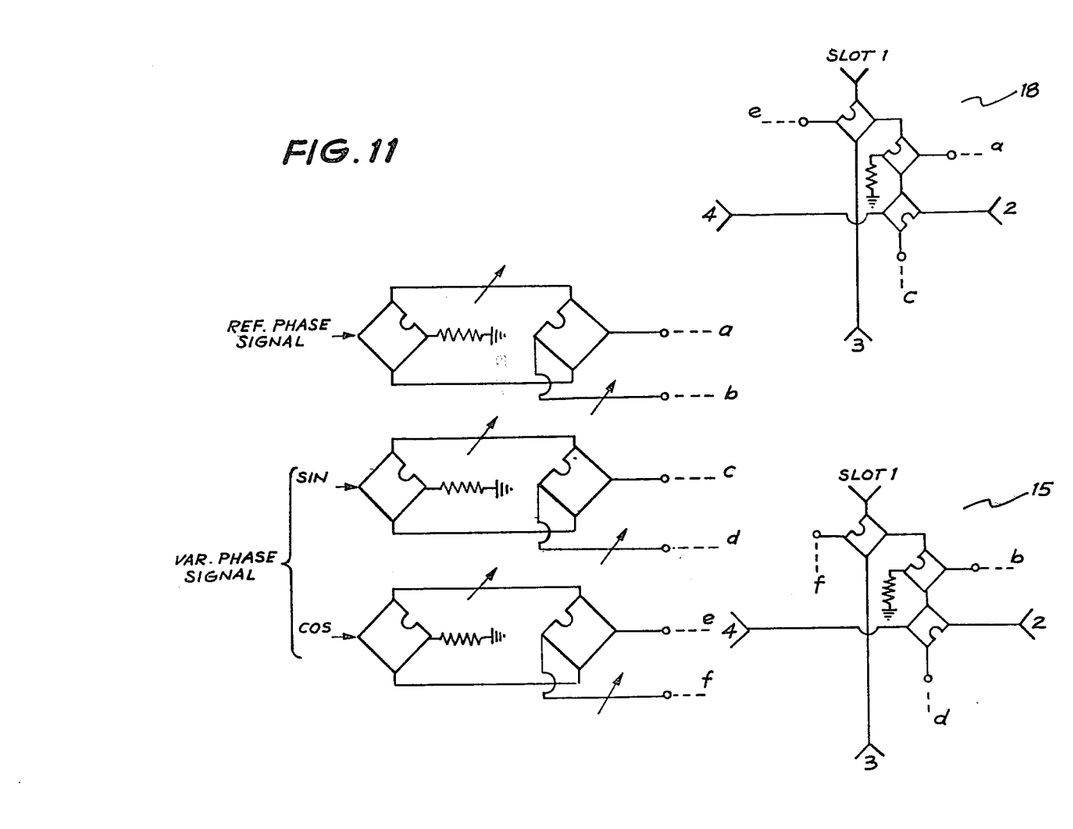
FIG. 11 shows a schematic representation of an antenna feed circuit which is applicable to the two-stack antenna array which forms a part of the illustration in FIG. 10.

A preferred embodiment of the invention is illustrated in FIGS. 10 and 11 of the drawings but, before proceeding to a description of the hardware aspects of the invention, reference is made to FIGS. 1 to 9 in order to illustrate the principles from which the invention has been developed.

Figure 1:
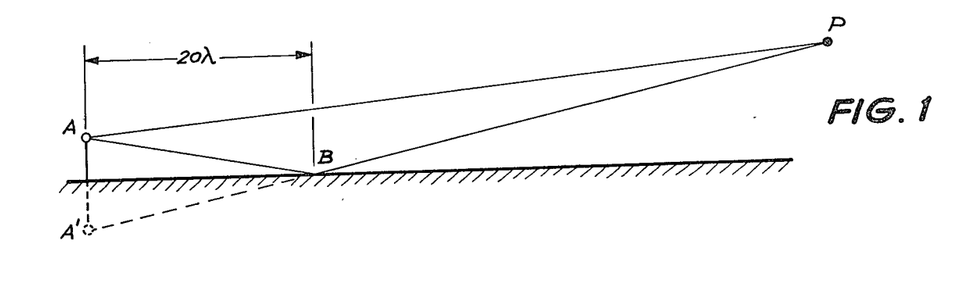
FIG. 1 shows a representation of a single-stack VOR antenna located above an "infinite" ground plane and radiating into a region of zero interference.

FIG. 1 shows an idealised VOR site, an antenna A being located above an infinite ground plane (i.e. a plane of radius greater than 20λ) and the antenna radiating into an obstruction-free region. Due to the existence of an infinite ground plane a true antenna image A′ will exist and, at a far field point P, the field components due to the real and image antennas A and A′ will be substantially in phase. The field components will be present at P due to the existence of direct and reflected radiations, and the reflected radiation may be stated to exist as a result of radiation due to ground currents which are induced at region B in the ground plane.

Under the ideal infinite ground plane situation shown in FIG. 1, the effect of re-radiatiating ground currents can be equated to the simple negative image illustrated. However, in a situation as shown in FIG. 2 where a short ground plane (radius 8λ) only exists and the antenna A radiates into the negative terrain, a simple negative image is not an accurate representation.

Figure 2:
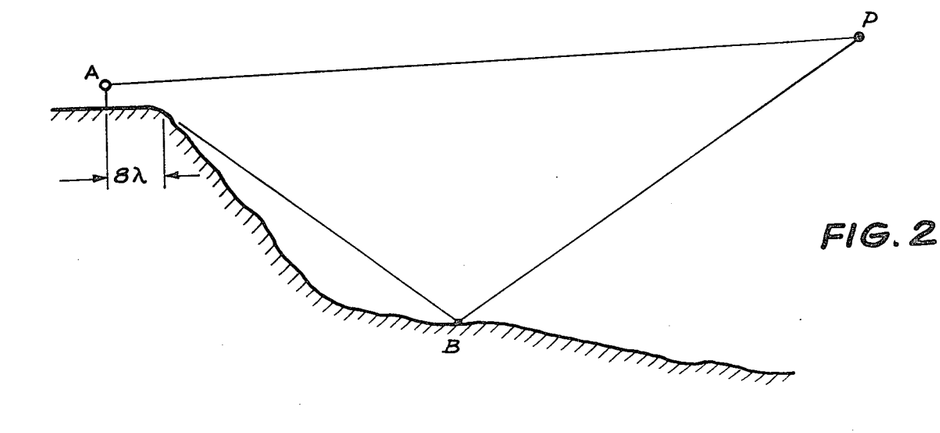
FIG. 2 shows the antenna of FIG. 1 when located above a short ground plane which falls away to negative angle terrain.
Figure 3:
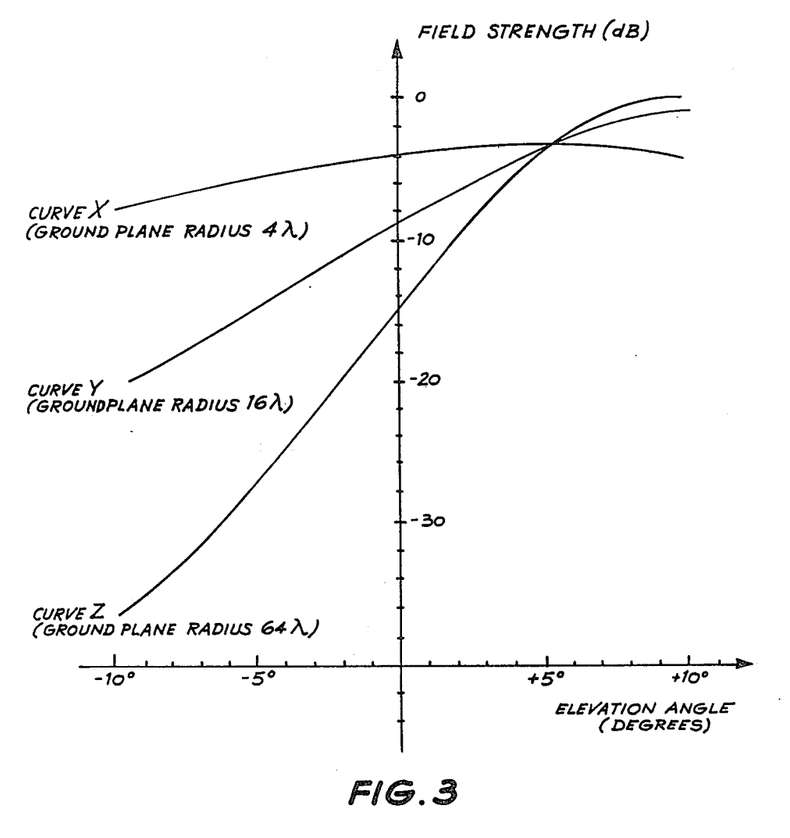
FIG. 3 shows a graphical analysis of field strength against positive and negative elevation angles for different lengths.

The contrasting conditions which are illustrated in FIGS. 1 and 2 are further illustrated in FIG. 3, which shows curves of field strength over a range of positive and negative angles of elevation. Curves x, y and z plot the field strength for three antennas sited at a height of 1.5λ above ground planes of radius 4λ, 16λ and 64λ respectively, and it can be seen that the field strength at a negative elevation angle of 3° improves by approximately 8 dB with an increase in ground plane radius from 4λ to 16λ. The relatively high field strength radiated into negative angles as indicated by curve x can be scattered by the further terrain back into the positive angles at +2° to +3° which are used by aircraft. When this scattering occurs off the line between the VOR antenna and the receiving aircraft, it constitutes a major potential source of multipath error.

As previously mentioned, the present invention seeks to diminish this problem by employing a multi-stack antenna array, with the stacked antenna elements being driven in a manner to effect a reduction in radiation into negative angles and thus to minimise potential multipath errors. This is achieved by effecting field cancellation in the negative angle near field region or, otherwise expressed, by creating ground current nulls in the plane extension of the existing ground plane.

Figure 4:
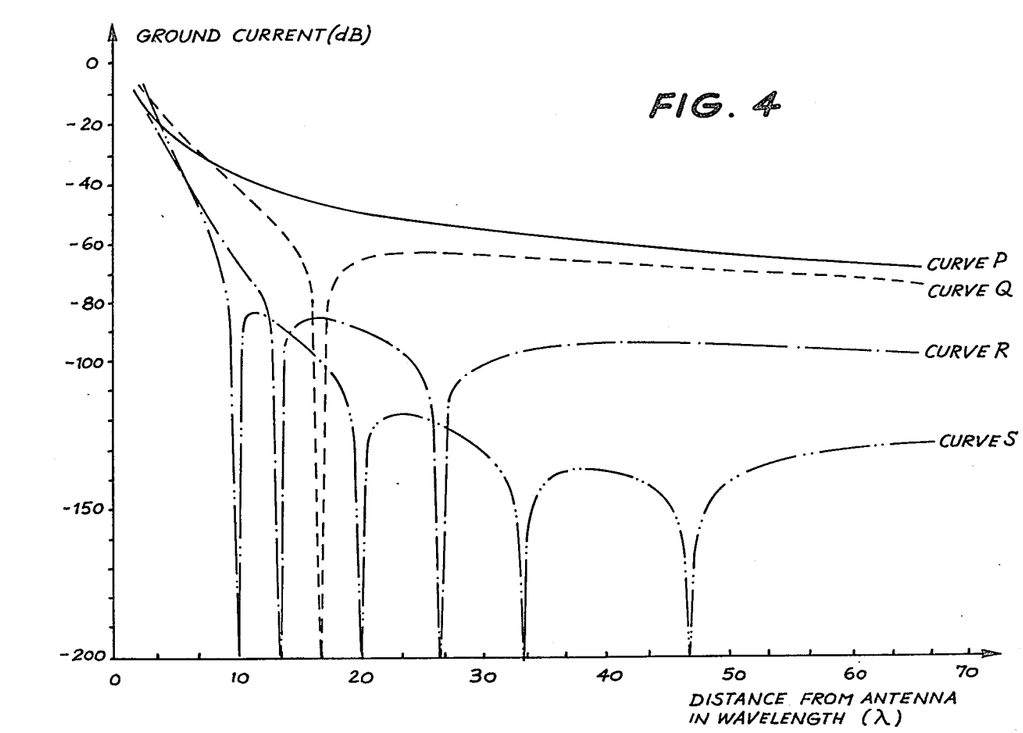
FIG. 4 shows plots of ground currents against distance from an antenna, respective ones of the curves being applicable to a single-stack antenna and multi-stack antenna arrays.

FIG. 4 shows a graphical analysis of ground current distribution with distance from an antenna, for four different antenna arrangements. Thus, curve P shows the ground current distribution for a single-stack antenna, which cannot be driven to produce any nulls, and the remaining curves are applicable to appropriately driven multi-stack antenna arrays. Curve Q exhibits a single null which is obtainable from a two-stack antenna, curve R is applicable to a three-stack antenna array which produces two current nulls, and curve S exhibits the four nulls which are produced by a five-stack array.

In the case of a two-stack array, the ground current null should be located beyond the existing ground plane, typically at a distance from the antenna which is equal to 1.5 to 3.0 times the existing ground plane radius. Drives appropriate to effect the illustrated ground current nulls are hereinafter described in the context of two-stack and three-stack arrays.

Figure 5:
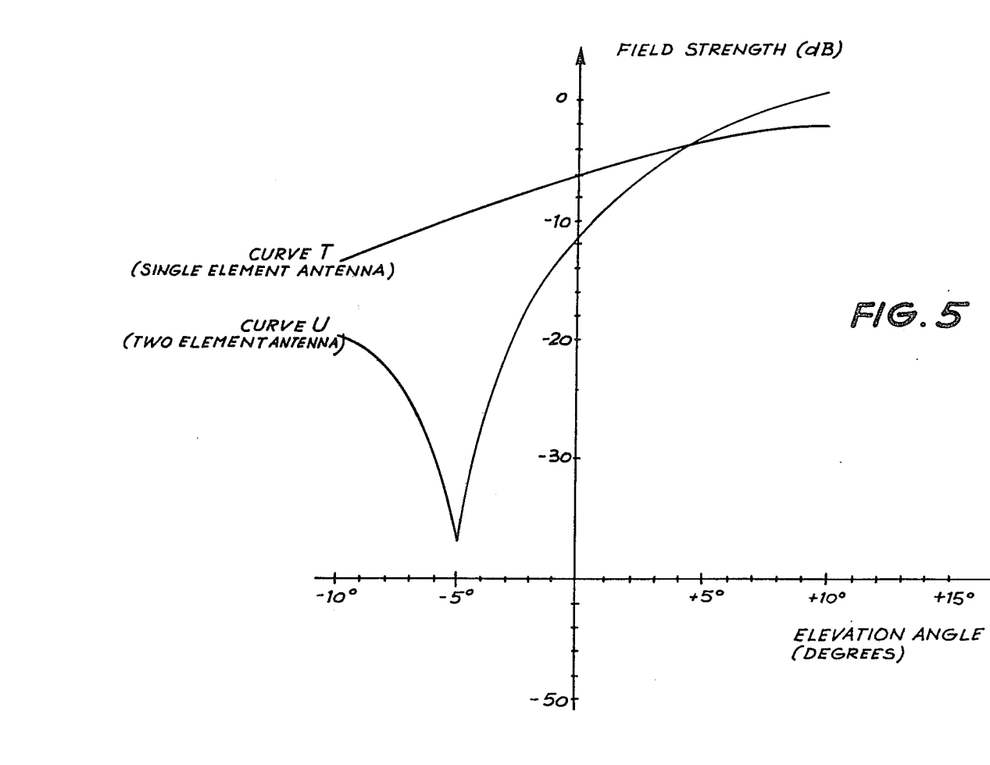
FIG. 5 shows a graphical analysis of field strength against positive and negative elevation angles, respective ones of the curves being applicable to single-stack and multi-stack arrays.

FIG. 5 illustrates the improvement obtainable with creation of a single ground current null by use of a two-stack array. Thus curve T in FIG. 5 shows the field strength applicable at various angles of elevation with feed to one only of the antenna elements and curve U shows the field strength with both elements driven to create a ground current null at 18λ distance from the antenna, the antenna being sited on a 8λ radius ground plane. A comparison of curves T and U in FIG. 5 shows a 13 dB improvement in field strength reduction at −3° with use of the two-stack array and consequential creation of a ground current null in the ground plane extension beyond the existing counterpoise.

Figure 6:
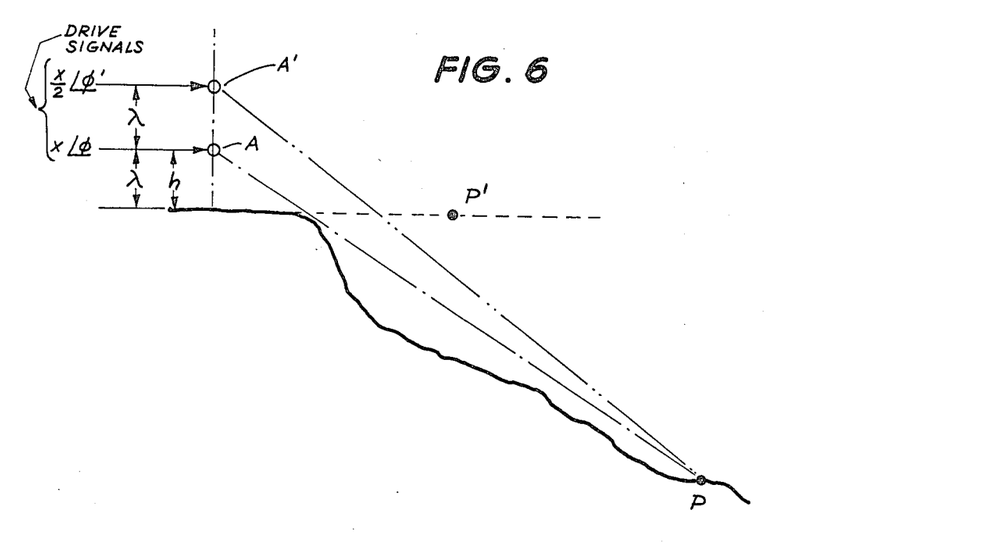
FIG. 6 shows a simplified negative angle radiation condition for a two-stack antenna array.
Figure 7:
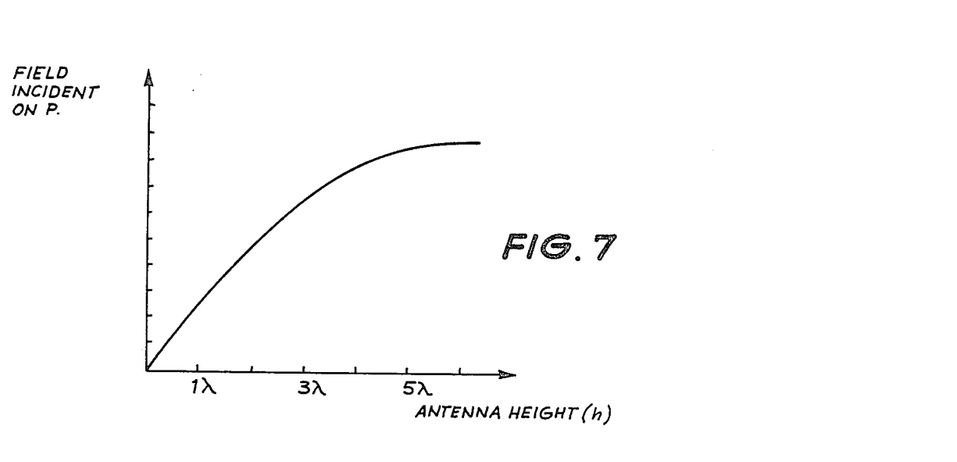
FIG. 7 shows a graphical plot of field strength (at a negative angle point P) against antenna height.

Reference is now made to FIGS. 6 and 7 of the drawings in the context of establishing drives which are relevant to a two-stack antenna array.

If a single dipole antenna A (FIG. 6) is located at height h above a finite ground plane of, say, 8λ radius, and if a receiver is placed at any point P in the negative angle region, a graph of received field can be plotted against height h of the antenna. Such a graph is shown in FIG. 7 and it can be observed that, over a considerable region of the plotted curve, the graph is approximately linear. That is, if the location height h of the antenna is doubled then the field strength at point P is approximately doubled.

Flowing from the condition illustrated by FIG. 7, if a second antenna element A′ is located at a height 2λ and the first antenna element A is located at height λ, as shown in FIG. 6, the total field $F_T$ at point P will be given by $$\bar{F}_T = \bar{F}_1 + \bar{F}_2$$

where
  $\bar{F}_1$ is the field component at P due to signal drive $x \angle \phi$ to element A, and
  $\bar{F}_2$ is the field component at P due to signal drive $(x/2) \angle \phi'$ to element A′.
Therefore, if $\bar{F}_1 = Kx \angle \phi + \theta$ and $\bar{F}_2 = \dfrac{2Kx}{2} \angle \phi' + \theta'$, where $\theta$ and $\theta'$ correspond to phase shifts due to the effective distance of P from elements A and A' respectively, and if the phase relationship of $\phi$ and $\phi'$ is selected to give $$\phi' + \theta' = \phi + \theta + 180°,$$

Then $$\bar{F}_T = Kx \underline{/\phi + \theta} + Kx \underline{/\phi' + \theta'}$$

$$= 0$$

Thus, by fixing the height of antenna element A' at double the height of element A and by halving the amplitude of the drive to element A' relative to that of the drive to element A, field cancellation can be effected at P if the phase relationship of the drive signals is adjusted to suit. Similarly, with antenna element A located at height $\lambda$ above the ground plane and excited with a signal of amplitude 1.00, a second antenna element A' located at height $3\lambda$ should be excited with a signal of (relative) amplitude 0.33.

Field cancellation at point P in FIG. 6 requires the creation of a ground current null at point $P^1$ as also shown in FIG. 6. The best position for point $P^1$ may need be established by emperical processes for any given site but, as previously mentioned, it has been established that, for a two-stack array, the ground current null should preferably be located beyond the existing ground plane at a distance from the antenna which is equal to 1.5 to 3.0 times the existing ground plane radius.

The drive signal which is required to be fed to the upper antenna element in order to produce a ground current null at a selected point in the ground plane extension can be computed from the following expression:

$$\frac{I_1 \times h \exp(-j 2\pi \sqrt{\beta^2 + h^2})}{\beta^2 + h^2} +$$

$$\frac{I_2 \times h_1 \exp(-j 2\pi \sqrt{\beta^2 + h_1^2})}{\beta^2 + h_1^2} = 0$$

where,
$I_1$ is the drive signal to the lower antenna element,
$I_2$ is the drive signal to the upper antenna element,
h is the height (in wavelengths) of the lower antenna element,
$h_1$ is the height (in wavelengths) of the upper antenna element,
$\beta$ is the required distance (in wavelengths) of the ground current null from the antenna array.

Thus, assuming a counterpoise of $8\lambda$ radius, a drive signal to the lower antenna element of $1.0 \underline{/0°}$ an inter element spacing of $1.5\lambda$, and a current null required to be placed at distance $12\lambda$ radius from the antenna array; then, $$\frac{1 \underline{/0°} \times 1.5 \exp(-j 2\pi \sqrt{12^2 + 1.5^2})}{12^2 + 1.5^2} =$$

$$\frac{-I_2 \times 3.0 \exp(-j 2\pi \sqrt{12^2 + 3^2})}{12^2 + 3^2}$$

$$\therefore I_2 = 0.523 \underline{/279°}$$

Figure 8A:
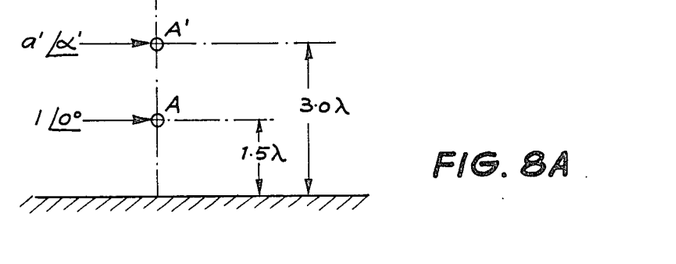

FIG. 8 shows a graphical analysis of field strength measurements against elevation angle for a VOR site employing antenna elements A and A' located at the heights indicated in respect of the antenna array which is illustrated in FIG. 8A. The relationship of the signal drives and the locations of the ground current null applicable to the respective curves as shown in FIG. 8 are provided in the following Table 1.

TABLE 1

| Curve | Antenna Element Height | | Relative Drive Signals | | Ground Plane Length | Position of Ground Current Null |
|---|---|---|---|---|---|---|
| | Element A | Element A' | Element A | Element A' | | |
| 1 | $1.5\lambda$ | $3.0\lambda$ | $1\underline{/0°}$ | 0 | $8\lambda$ | — |
| 2 | $1.5\lambda$ | $3.0\lambda$ | $1\underline{/0°}$ | $0.523\underline{/279°}$ | $8\lambda$ | $12\lambda$ |
| 3 | $1.5\lambda$ | $3.0\lambda$ | $1\underline{/0°}$ | $0.515\underline{/260°}$ | $8\lambda$ | $15\lambda$ |
| 4 | $1.5\lambda$ | $3.0\lambda$ | $1\underline{/0°}$ | $0.508\underline{/240°}$ | $8\lambda$ | $20\lambda$ |

The foregoing description has been confined to factors pertaining to derivation of drive signals which are applicable to a two-stack array, and emphasis has been placed on such array because it is thought that it will have greater application to many VOR sites than higher order array structures. The approach which should be taken toward the derivation of drive signals which should be applied to three, four, etc.—stack arrays should be determinable by those skilled in the art, having been given the basic design concept upon which the invention is based. Namely the concept of creating current nulls in the projection of the ground plane beyond the counterpoise.

Figure 9A:
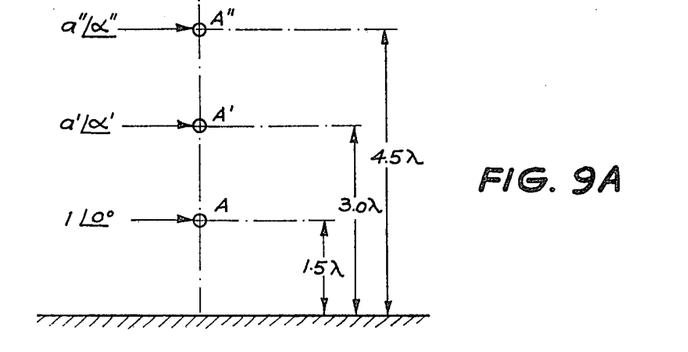

However, reference may be made to FIG. 9 of the drawings which shows plots of field strength measurements against elevation angle for a VOR site employing a three-stack array having elements A, A' and A" located at the heights indicated in respect of the array which is illustrated in FIG. 9A. The relationship of the signal drives and the location of the resultant ground current nulls applicable to the respective curves shown in FIG. 9 are provided in the following Table 2.

TABLE 2

| Curve | Antenna Element Height | | | Relative Drive Signals | | | Ground Plane Length | Position of Ground Current Nulls |
|---|---|---|---|---|---|---|---|---|
| | Element A | Element A' | Element A" | Element A | Element A' | Element A" | | |
| 1 | $1.0\lambda$ | $2.5\lambda$ | $4.0\lambda$ | $1\underline{/0°}$ | — | — | $8\lambda$ | — |

TABLE 2-continued

| Curve | Antenna Element Height | | | Relative Drive Signals | | | Ground Plane Length | Position of Ground Current Nulls |
|---|---|---|---|---|---|---|---|---|
| | Element A | Element A' | Element A" | Element A | Element A' | Element A" | | |
| 2 | 1.5λ | 3.0λ | 4.5λ | 1∠0° | — | — | 8λ | — |
| 3 | 1.5λ | 3.0λ | 4.5λ | 1∠0° | 0.584∠−98.6° | 0.262∠−153.3° | 8λ | 10λ and 30λ |
| 4 | 1.5λ | 3.0λ | 4.5λ | 1∠0° | 0.629∠−109.6° | 0.247∠−179.0° | 8λ | 11.5λ and 35λ |
| 5 | 1.5λ | 3.0λ | 4.5λ | 1∠0° | 0.662∠−117.9° | 0.237∠160.7° | 8λ | 13λ and 40λ |

The merits of employing a three-stack array over a two-stack array (when the terrain conditions dictate) will be appreciated from a comparison of Curve 2 in FIG. 8 with Curve 4 in FIG. 9, both of which curves are applicable to a system which produces a ground current null in the order of 12λ radial distance from the respective antenna arrays. Whereas Curve 2 in FIG. 8 shows an average fall in field strength of approximately 1.5 dB per degree in the negative angle region; Curve 4 in FIG. 9 exhibits an average fall of approximately 6 dB per degree in the negative field region.

Reference is now made to FIG. 10 of the drawings which shows a schematic implementation of a VOR system which employs a two-stack antenna array and which is based on the previously described design approach.

The VOR system includes a conventional VOR signal generating arrangement 10 which comprises an r.f. generator 11, a reference phase signal generator 12, a variable phase signal generator 13 and a sin/cos function generator 14. Such arrangement in its various possible forms is well known and is not further described.

In a schematic sense, the reference and variable phase signals are fed directly to a lower element 15 of the two-stack antenna array 16 and, via an amplitude attenuator/phase shifter 17, to the upper element 18 of the array. The amplitude attenuator/phase shifter 17 functions to attenuate equally and phase-shift equally each of the three drive signals which are fed to the upper element 18 relative to the corresponding drive signals to the lower element 15. The attenuation is adjusted to provide for a drive signal amplitude to the upper element 18 which is smaller than the amplitude of the drive signal to the lower element 15.

The antenna elements 15 and 18 may be of any known form suitable for use in radiating a VOR field and, for convenience of reference only, the elements are illustrated in FIG. 9 as cylindrical radiators having, in each case, four orthogonally arranged vertical (longitudinally extending) slots. The antenna elements are stacked vertically one above the other and feed connections to the slots may be made in the conventional way.

Each of the (upper and lower) antenna elements should provide matching vertical patterns for the reference and variable phase signals and this can be achieved only if the same antenna elements are used for transmitting both functions. Each antenna element preferably comprises four orthogonally disposed slotted radiators with each slot being backed by a separate compact waveguide resonant cavity, and such an element is described and illustrated in Australian patent application No. PE 6964/80 filed Dec. 17, 1980 corresponding to U.S. patent application Ser. No. 280,180 filed on the same day as the present application. The respective reference phase signals which are fed to the upper and lower antenna elements are fed to all four slots of the respective elements. Sine and cosine components of the respective variable phase signals which are fed to the upper and lower antenna elements are fed to orthogonally disposed pairs of slots in the respective elements.

FIG. 11 shows feed and attenuating/phase shifting circuitry appropriate to the four slots of each antenna element. The feed circuitry for the reference phase signal and for each of the (sin/cos) variable phase signals includes a two-bridge arrangement, with a line stretcher being incorporated in one line between the bridges to permit amplitude adjustment of the feed signal. Also, a line stretcher is located in the output of each circuit to permit phase adjustment of the signal.

What is claimed is:

1. A VOR system comprising means for generating a reference phase signal, means for generating variable phase signal components, an antenna array comprising at least two vertically stacked antenna elements located above a ground plane, means for feeding both the reference phase signal and the variable phase signal components to each of the antenna elements, and means for adjusting the amplitude and phase of the signals fed to one or more of the antenna elements relative to the amplitude and phase of the signals fed to the or each other of the antenna elements in a manner such that at least one null is produced in the radiated field H-component which is substantially tangential to a projection of the ground plane.

2. A method of driving a VOR system having an antenna array comprising at least two vertically stacked antenna elements located above a ground plane; wherein a reference phase signal and variable phase signal components are fed to each of the antenna elements, and wherein the signals which are fed to one or more of the antenna elements are adjusted in amplitude and phase relative to the signals which are fed to the or each other of the antenna elements whereby at least one null is produced in the radiated field H-component which is substantially tangential to a projection of the ground plane.

3. The method as claimed in claim 2 wherein the VOR system comprises a said antenna array having two only said antenna elements, and wherein the reference phase signal and the variable phase signal components which are fed to the upper element have magnitudes lower than those of the corresponding reference phase signal and variable phase signal components which are fed to the lower element.

4. The method as claimed in claim 3 wherein a single null in the H-component of the radiated field is located beyond the existing ground plane at a radial distance from the antenna array which is equal to 1.5 to 3.0 times the existing ground plane radius.

5. The method as claimed in claim 3 wherein a single null in the H-component of the radiated field is located beyond the existing ground plane at a radial position located 12λ to 20λ distant from the antenna array, where λ is the wavelength of the reference phase signal.

6. The method as claimed in claim 3 wherein the reference phase signal and the variable phase signal components which are fed to the upper antenna element have magnitudes falling within the range 0.25 to 0.60 times the magnitude of the corresponding signal and signal components fed to the lower antenna element, and wherein the reference phase signal and variable phase signal components which are fed to the upper antenna element each have a phase angle which is greater than the phase angle of the signal or signal components fed to the lower antenna element by an amount falling within the range 210° to 280°.

7. The method as claimed in claim 3 wherein each of the antenna elements comprises a cylindrical antenna element having four orthogonal longitudinally extending slots, with each slot being backed by a separate waveguide resonant cavity.

8. The method as claimed in claim 7 wherein the respective reference phase signals which are fed to the upper and lower antenna elements are fed to all four slots of the respective elements, and wherein sine and cosine components of the respective variable phase signals which are fed to the upper and lower antenna elements are fed to orthogonally disposed pairs of slots in the respective elements.

9. A method of driving a VOR system having an antenna array comprising two vertically stacked antenna elements located above a ground plane; wherein a reference phase signal and variable phase signal components are fed to each of the antenna elements, wherein the reference phase signal and variable phase signal components which are fed to the upper element are adjusted in amplitude and phase relative to the reference phase signal and variable phase signal components which are fed to the lower element whereby at least one null is produced in the radiated field H-component which is substantially tangential to a projection of the ground plane, wherein the reference phase signal and the variable phase signal components which are fed to the upper element have magnitudes lower than those of the corresponding reference phase signal and variable phase signal components which are fed to the lower element, and wherein the amplitudes of the reference phase signal and the variable phase signal components which are fed to the upper and lower antenna elements respectively are related by the equation $$\frac{I_1 \cdot h \exp(-j 2\pi \sqrt{\beta^2 + h^2})}{\beta^2 + h^2} + \frac{I_2 \cdot h_1 \exp(-j 2\pi \sqrt{\beta^2 + h_1^2})}{\beta^2 + h_1^2} = 0$$

where:
  $I_1$ is the amplitude of the reference phase signal or variable phase signal components fed to the lower antenna element,
  $I_2$ is the amplitude of the reference plane of variable plane signal components fed to the upper antenna element,
  $h$ is the height (in wavelengths) of the lower antenna element,
  $h_1$ is the height (in wavelengths) of the upper antenna element, and
  $\beta$ is the required radial distance (in wavelengths) of the field H-component null from the antenna array.

10. A method of driving a VOR system having an antenna array comprising two vertically stacked antenna element located above a ground plane; wherein a reference phase signal and variable phase signal components are fed to each of the antenna elements, wherein the reference phase signal and variable phase signal components which are fed to the upper element are adjusted in amplitude and phase relative to the reference phase signal and variable phase signal components which are fed to the lower element whereby at least one null is produced in the radiated field H-component which is substantially tangential to a projection of the ground plane, wherein the reference phase signal and the variable phase signal components which are fed to the upper element have magnitudes lower than those of the corresponding reference phase signal and variable phase signal components which are fed to the lower element, wherein the upper and lower antenna elements are spaced-apart by a distance falling within the range $1\lambda$ to $3\lambda$, where $\lambda$ is the wavelength of the reference phase signal and wherein the lower antenna element is located approximately midway between the upper element and the ground plane.

* * * * *